United States Patent [19]

Engel et al.

[11] 4,243,876

[45] Jan. 6, 1981

[54] BACKGROUND LIGHT INTENSITY COMPENSATION CIRCUIT FOR A LINE SCAN CAMERA SYSTEM

[75] Inventors: Joseph C. Engel, Monroeville; Leonard C. Vercellotti, Oakmont, both of Pa.; Dale W. Schroeder, Iowa City, Iowa

[73] Assignee: Westinghouse Electric Corp., Pittsburgh, Pa.

[21] Appl. No.: 60,511

[22] Filed: Jul. 25, 1979

[51] Int. Cl.³ .......................... G06K 7/14; G06K 7/10
[52] U.S. Cl. ................................. 235/455; 434/358; 250/466
[58] Field of Search ............. 235/455; 340/146.3 AG; 35/48 B; 250/555, 566, 568, 569

[56] References Cited

U.S. PATENT DOCUMENTS

| | | | |
|---|---|---|---|
| 3,560,751 | 2/1971 | Buettner et al. | 235/455 |
| 3,628,031 | 12/1971 | Azure, Jr. | 235/455 |
| 3,692,983 | 9/1972 | Cucciati et al. | 235/455 |
| 3,789,215 | 1/1974 | Penny | 250/206 |
| 3,820,068 | 6/1974 | McMillin | 340/146.3 AG |
| 4,020,357 | 4/1977 | Punis | 250/568 |
| 4,047,023 | 9/1977 | Key et al. | 235/455 |

*Primary Examiner*—Daryl W. Cook
*Attorney, Agent, or Firm*—M. P. Lynch

[57] ABSTRACT

In a line scan camera system employed to extract information from marks or characters on a document, a memory circuit is used to store the average white and black video output from the camera so that a given white-to-black transition can be compared to adaptive white and black references to compensate for variations in document background light intensity and vignetting associated with the lens of the line scan camera system.

12 Claims, 7 Drawing Figures

BACKGROUND LIGHT INTENSITY COMPENSATION CIRCUIT FOR A LINE SCAN CAMERA SYSTEM

BACKGROUND OF THE INVENTION

A conventional camera lens tends to gather more light at the center than at the edge. This results in a variation in the light intensity from the center to the edge of an image transmitted by a lens when viewing a uniformly illuminated object. In the application of a line scan camera and associated lens in a system for the line-by-line scanning of a uniformly illuminated document, the intensity of the scan line will typically vary as much as 2:1 across the image developed by the lens. This object lens aberration is called "vignetting". The variation in image light intensity caused by vignetting results in distortion, or an inaccurate representation of data mark or character information viewed during the scan line of a document. In the application of the line scan system for reading marks on a student answer sheet, the "white-to-black" response for a mark in the center of the sheet would be larger than than for the same mark on the edge of the sheet.

Variations of light intensity with respect to document ambient or background can also be the result of the non-uniformity of the grain of the document paper, non-uniformity of the illumination of the document, dirt on mirrors or other surfaces.

SUMMARY OF THE INVENTION

Typically, test-scoring applications rely on the relative "weight" of the pencil, or ink, mark to determine if a valid mark has been entered. Thus, variations in ambient or document background light intensity can seriously reduce the accuracy of the line scan camera system.

Yet another problem exists in the application of a line scan camera system as a mark reading device if the white background reference varies. Such a variation will change the line scan camera's absolute light-to-dark or "white-to-black" response. If the camera's output is compared to fixed references to "weigh" the validity of a mark, variations in the white reference, or contrast, will change the evaluation of a given mark. In the event the white response of the camera is increased as a result of variations in ambient light or document background light conditions, or lens vignetting the scoring, or "weighing", of the marks may vary significantly.

BRIEF DESCRIPTION OF THE DRAWINGS

The invention will become more readily apparent from the following exemplary description in connection with the accompanying drawings.

DESCRIPTION OF THE PREFERRED EMBODIMENT

Figure 1:
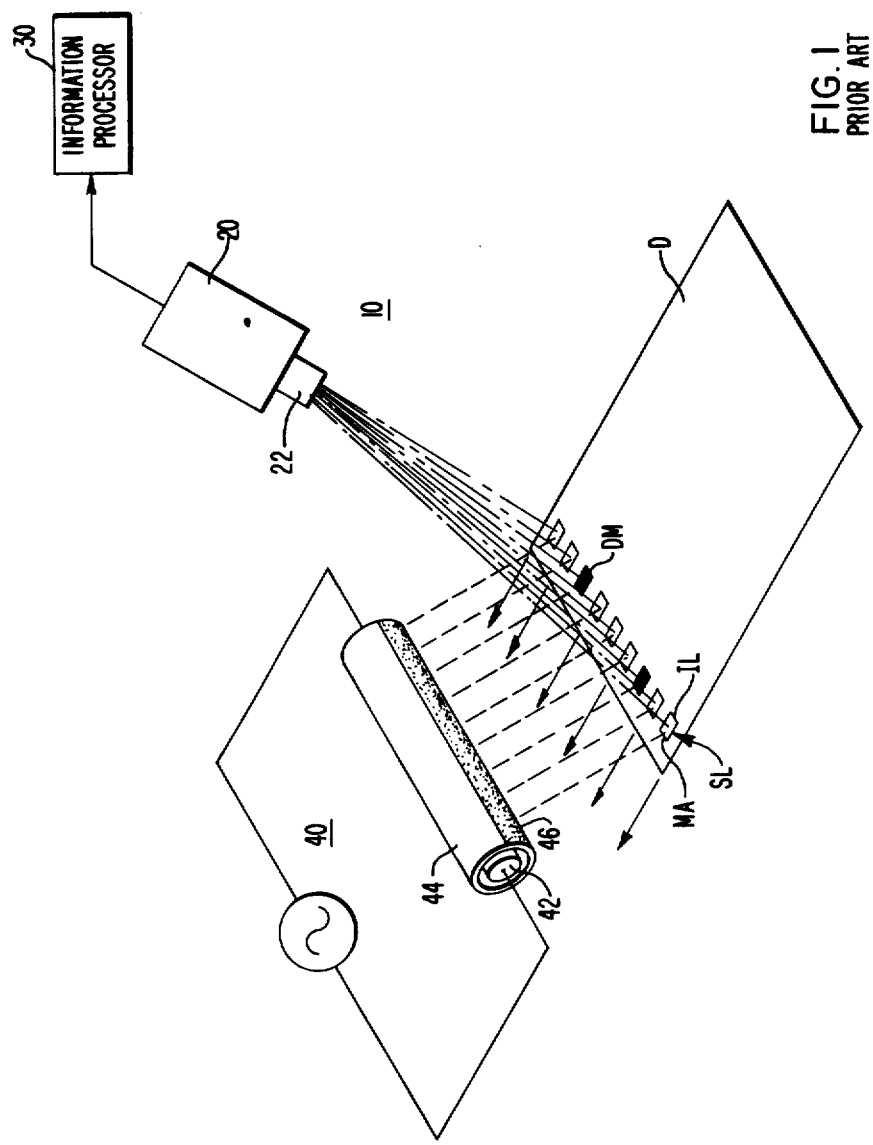
FIG. 1 is a schematic illustration of a line scan camera system and lens employed in a document-reading application.

Referring to FIG. 1, there is schematically illustrated a Prior Art document scanning system 10, including a line scan camera 20 for developing an analog output signal indicative of the mark information appearing on a line-by-line basis of the document D as the document D advances beneath the scan line field of view of the line scan camera 20. The camera object lens 22 functions to transmit the scan line object information of the document D as an image to the sensor array of the line scan camera 20. The scan line output signal, which may be analog or digital, developed by the camera 20 in response to the presence or absence of marks on the successive scan lines SL of the document D, as imaged by the lens 22, is supplied to an information processor circuit 30. The implementation of a line scan document reading system incorporating a commercially available line scan camera (Fairchild Model CCD-1300) is described in detail in pending U.S. Patent Application Ser. No. 000,457, filed Jan. 2, 1979, entitled "Optical Reading System," assigned to the assignee of the present invention, and incorporated herein by reference.

The line scan field of view of the line scan camera 20 is illuminated by a linear light source 40. A typical light source is illustrated as consisting of a tubular incandescent lamp 42 positioned within a tubular light-reflecting element 44, having a longitudinal light-diffuser element 46 for concentrating the light emitted from the light source 40 onto the line of the document D corresponding to the scan line SL of the line scan camera 20. A linear light source comparable to the light source 40 is described in detail in pending Patent Application Ser. No. 900,945 filed Apr. 28, 1979, entitled "Improved Linear Light Source", assigned to the assignee of the present invention and incorporated herein by reference.

The document D is illustrated as consisting of rows of predetermined mark areas MA defined as preprinted ink outlines IL. The format of mark areas MA developed on a document can typically represent a student's test answer sheet, an election ballot, an inventory form, etc. The function of the line scan camera 20, in combination with the information processor 30, is to distinguish between mark areas having a data mark DM and mark areas without data marks DM.

Figure 2:
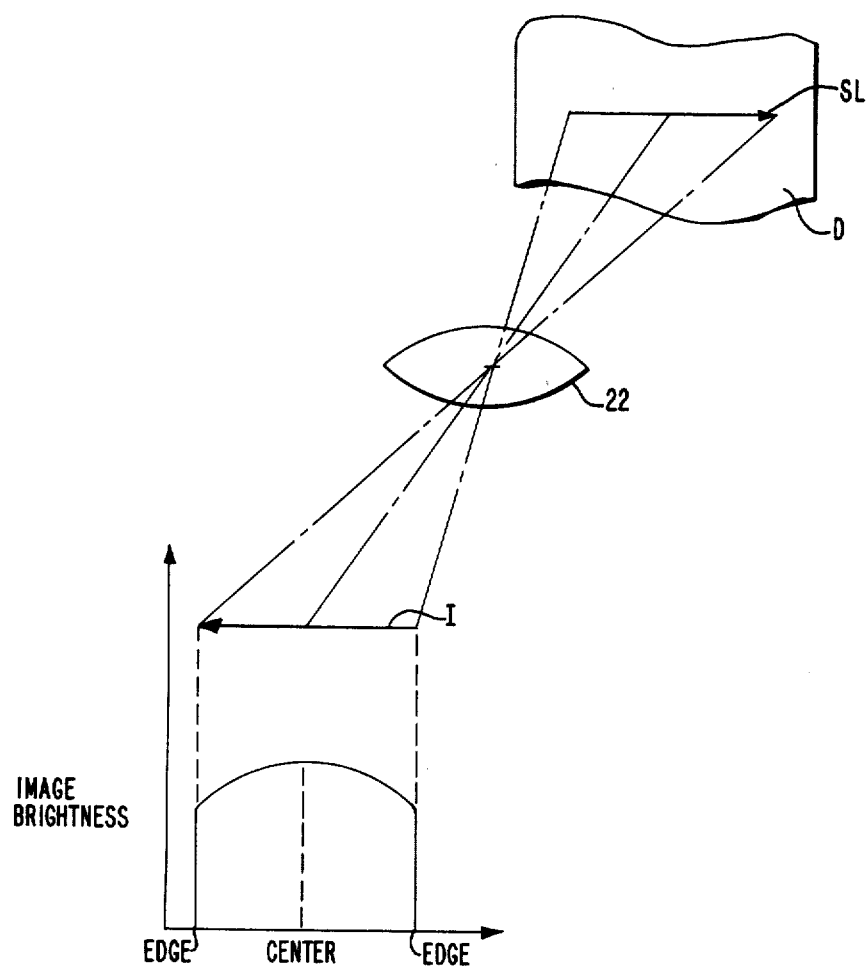
FIGS. 2, 3 and 4 are graphical illustrations of the effect of lens vignetting in the system of FIG. 1.
Figure 3:
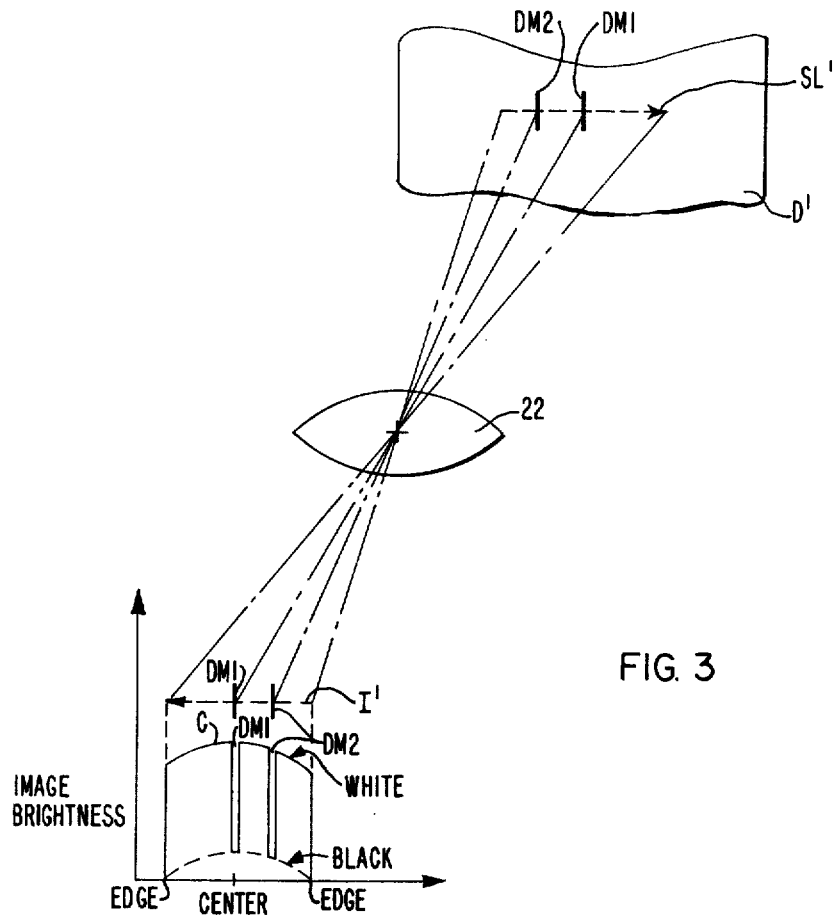
Figure 4:
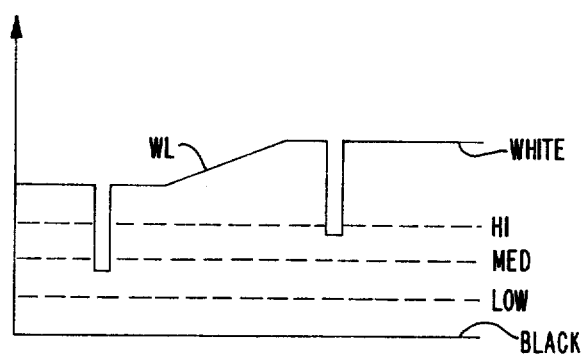

The vignetting resulting from conventional object lens aberration is illustrated in FIGS. 2 and 3. Referring to FIG. 2, wherein the object corresponds to a horizontal black line of a document D from which an image I is created by the object lens 22, the brightness, or light intensity, of the image I transmitted to a line scan camera by the object lens 22 has a peak brightness at the center and diminished intensity at the edges.

The light-to-dark or "white-to-black" distortion of a light background document with dark marks resulting from lens vignetting is graphically illustrated in FIG. 3 with reference to an image I' developed in response to data marks DM1 and DM2 appearing in the scan line SL' of a document D' as viewed by a line scan camera. As illustrated, the "white-to-black" response to a mark in the center of the document D, corresponding to data mark DM1, is larger than that for the same size and density mark DM2 appearing near the edge of the document D. Inasmuch as the marks DM1 and DM2 absorb a portion of the light illuminating the document D, the portions of the image corresponding to these marks appear darker, as illustrated in the camera response curve C of FIG. 3. Thus, it is apparent that the operation of an information processor 30 which evaluates or interrogates the information on a document D on the basis of the "weight" or darkness of a data mark DM will suffer due to the aberration of the object lens 22.

Similarly, the accuracy of the information processor 30 of FIG. 1 in analyzing or evaluating the data mark information on a document D will suffer if the white background viewed by the line scan camera 20 varies. This variation in the background light condition or intensity can result from non-uniform document illumination by the light source 40 or a variation in the grain of te paper of the document D. Such a variation will change the absolute white-to-black response of the line scan camera 20. Thus, in a system 10 wherein the information processor circuit 30 differentiates between data marks DM having weights, or darkness levels, on the basis of low, medium and high, the scan line output signal from the line scan camera 20 can be erroneously interpreted by the information processor circuit 30 if the white background level changes results in a non-uniform contrast for the information of the scan line output signal.

Figure 5A:
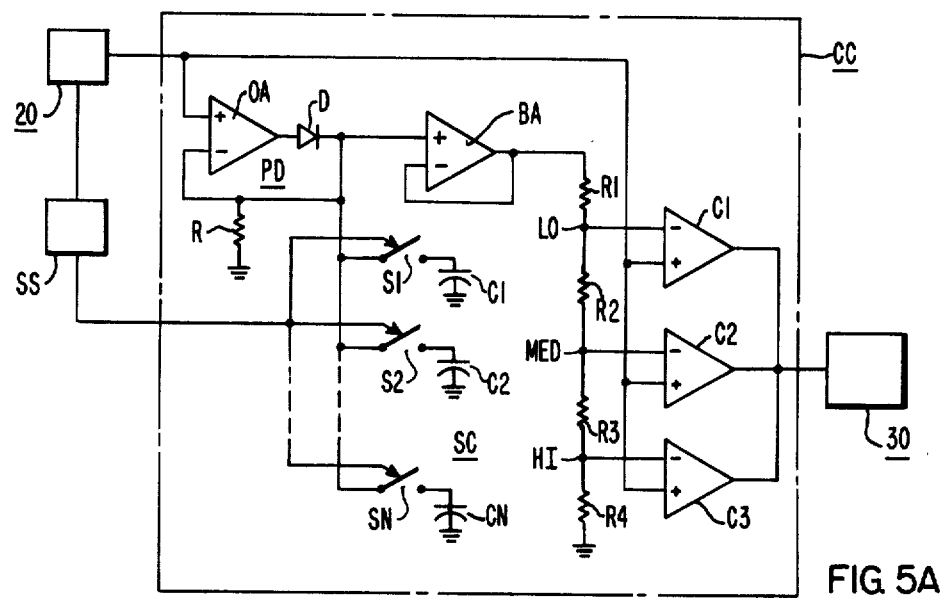
FIG. 5A is a schematic illustration of a light intensity compensation circuit for lens vignetting and variatons in background light intensity in accordance with the invention.

Referring to FIG. 5A there is schematically illustrated a compensating circuit CC for lens vignetting and other aberrations experienced by a line scan camera 20 which cause the white (or black) response of the line scan camera 20 to vary. Storage elements, herein illustrated to be capacitors C1, C2, . . . CN, in series with switching elements S1, S2, . . . SN, form a network SC which is connected to the output of an operational amplifier OA of a peak detector circuit PD. The capacitors C1-CN store the peak outputs from the line scan camera 20 during each of N segments of a scan line SL. This is accomplished by closing switch S1 during the first segment of a scan line SL, closing switch S2 during a second segment of the scan line SL, etc. The corresponding storage elements, i.e., capacitors, are charged through diode D to the peak voltage occurring during the scan line segment in which the corresponding switch element is closed. Thus, capacitor C1 is charged to a peak voltage during the first segment of the scan line SL during which time the switch S1 is closed.

The output of the operational amplifier OA is supplied not only to the network SC, but also is supplied as an input to a buffer amplifier circuit BA. Thus, while the peak voltage during any given segment of a scan line SL is being stored in the corresponding capacitor, the same voltage is being applied to a resistor network RN. In the embodiment illustrated, where three levels of "weight", or darkness, of the data marks is to be differentiated during the processing of information by the information processor circuit 30, the resistor network RN consists of resistors R1, R2, R3 and R4, which produce three nodes labeled LO, MED and HI. The nodes correspond to voltage levels developed across the resistors of the resistor network RN and the voltage of each of the nodes is supplied as the negative input to each of three comparator circuits C1, C2 and C3, respectively. The scan line output signal of the line scan camera 20 is supplied as the positive input to each of the comparator circuits C1, C2 and C3. Thus, the portion of the video output from the line scan camera 20 corresponding to a given segment of the scan line SL is compared to the stored peak signal level for that given segment. This stored peak signal level may be the result of the present scan line or a previous scan line, or scan lines, of the same document. Thus, for instance, a predetermined white-to-black transition; i.e., such as 55% of the value shown, will be scored as a medium weight mark MED whether it occurs during the first or any other segment of the scan line, thus the effect of vignetting or background light intensity variation is cancelled.

This operation produces an essentially uniform contrast for the scan line output signal of a document.

The sequential switching of the switches S1-SN is controlled by the switch control circuit SS. The circuit SS initiates the switching sequence in response to a video valid, or sync signal, from the camera 20 which identifies the beginning of information from a scan line of the document D.

The resistor R associated with the operational amplifier OA of the peak detector circuit PD provides a means for slowly discharging the capacitors C1-CN to ground so that a very white scan line will eventually be forgotten. While the optimum discharge time may vary with the application, it is desirable to store the peak value for each of the scan line segments as quickly as possible. At a minimum the discharge should occur during the period between the feeding of successive documents for viewing by the system 10.

More typically, however, the selection of the resistor R and the capacitors C1-CN of the peak detector circuit PD are selected to provide a decay of the stored peak signal level after a predetermined number of scan lines corresponding to the longest anticipated data mark DM. This permits accurate reading of the rows of information from the document D while providing periodic refreshing of the stored peak signal levels to account for changes in the background of ambient light intensity of the document. Such background changes could result from fading of the document paper, a large stain, i.e., coffee, etc.

The discussion has been directed to the more typical scanning conditions for reading dark, or black, marks from a light, or white, document background with the peak detector circuit PD storing positive polarity peak levels of white background to compensate camera output signals for variations in document background conditions and lens vignetting. The same technique is clearly implementable for conditions where light marks are read from dark background documents by storing negative polarity peak levels of dark or black document background for output signal compensation.

Figure 6:
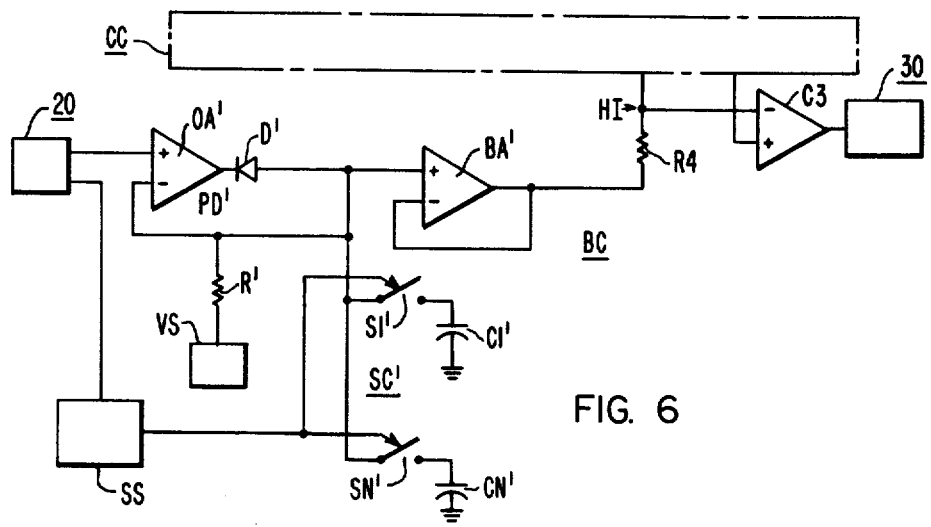
Figure 5B:
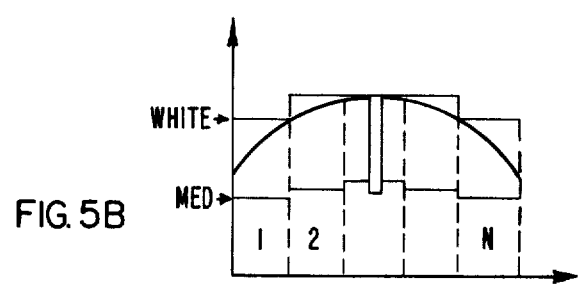
FIG. 5B is a graphical illustration of the operation of the circuit of FIG. 5A; and, FIG. 6 is an electrical schematic illustration of a compensation circuit for the line scan camera's black response.

With the addition of the compensation circuit CC, it has been assumed that the black response of the line scan camera 20 is constant, thus requiring no provision for compensating the black response. If compensation for black response is required it can be realized by a black compensation circuit BC which employs a negative peak-detecting circuit PD' and a switch-capacitor network SC' as schematically illustrated in FIG. 6. The output of the buffer amplifier BA' of the black compensation circuit of FIG. 6 is connected to the resistor network RN of FIG. 5A at the terminal of the resistor R4 opposite the HI node of the compensation circuit CC of FIG. 5A. Switch S1 of circuit CC and switch S1' of circuit BC are opened and closed simultaneously as is the case which each of the successive corresponding switches of the compensation circuits CC and BC by the operation of the switch control circuit SS. Inasmuch as the output of the line scan camera 20 is assumed to be positive, the resistor R' of circuit BC is connected to a positive voltage source VS so that the negative peak can discharge any given capacitor storage element of network SC' through the diode D' if the output of the line scan camera 20 during the scan line segment corresponding to the capacitor is less than the voltage stored on the capacitor. The current through resistor R' in response to the applied voltage from voltage source VS slowly recharges the capacitors C1'... CN'.

In those instances where the variation in black response is primarily due to a DC bias shift in the output of the line scan camera 20 and is thus independent of the scan line segments, the compensation circuit BC requires only one storage element, i.e. capacitor, and one switch.

The switches S1–SN of compensation circuit CC, and the switches S1'–SN' of the compensation circuit BC must operate at N (the number of switches) times the scan frequency of the line scan camera 20, and thus for most applications must be very fast switching devices. Suitable switching elements that are commercially available for implementing these requirements include solid state MOS (metal oxide) transistors.

What is claimed is:

1. A method for compensating a document scanning system for variations in background and ambient light conditions and/or aberrations produced by optics associated with a scanning device employed by the system to extract information on a line-by-line basis from a document, comprising the steps of, scanning said document on a line-by-line basis with a scanning device, said device generating a scan line output signal which is a function of the light intensity of the scan line, storing peak signal levels of each of a predetermined number of segments of a scan line output signal, and comparing the scan line output signals of said document to the corresponding stored peak signal levels to compensate said scan line output signals on a segment-by-segment basis for variations in document background light conditions and/or lens vignetting.

2. A method as claimed in claim 1, further including the steps of, refreshing the stored peak signal levels of said predetermined segments after a predetermined number of scan lines, said refreshing of said stored peak signal levels to occur at least at the beginning of the scanning of each document.

3. A method as claimed in claim 2 wherein said document consists of a preprinted form on light paper including designated mark areas for accommodating the entry of dark marks, said dark marks comprising the information to be extracted by said scanning device, said mark areas having a predetermined length, said scan lines being essentially perpendicular to the length of said mark areas, said scan line output signal being a measurement of the light-to-dark response of the scanning device to the information on a scan line, said refreshing occurring after a number of scan lines corresponding to the length of a mark area, said stored peak signal levels corresponding to the maximum light intensity of said predetermined segments.

4. A method as claimed in claim 1 wherein said document has a dark background and the information contained thereon appears as light marks to said scanning device, said scan line output signal being a measurement of the dark-to-light response of the scanning device, said stored peak levels corresponding to the minimum light intensity of said predetermined segments.

5. A method as claimed in claim 1 wherein said document has a light background and the information contained thereon appears as dark marks to said scanning device, said scan line output signal being a measurement of the light-to-dark response of the scanning device, said stored peak levels corresponding to the maximum light intensity of said predetermined segments.

6. Apparatus for compensating a document scanning system for variations in background and ambient light conditions and/or aberrations produced by optics associated with a scanning device employed by the system to extract information on a line-by-line basis from a document, comprising the steps of, means for scanning said document on a line-by-line basis generating a scan line output signal which is a function of the light intensity of the scan line, means for storing peak signal levels of each of a predetermined number of segments of a scan line output signal, and means for comparing the scan line output signals of said document to the corresponding stored peak signal levels to compensate said scan line output signals on a segment-by-segment basis for variations in document background light conditions and/or lens vignetting.

7. Apparatus as claimed in claim 6, further including, means for refreshing the stored peak signal levels of said predetermined segments after a predetermined number of scan lines.

8. Apparatus as claimed in claim 6 wherein said document consists of a preprinted form on light paper including designated mark areas for accommodating the entry of dark marks, said dark marks comprising the information to be extracted by said means for scanning, said scan line output signal being a measurement of the light-to-dark response of said means for scanning to the information on the scan line, and said stored peak signal levels corresponding to the maximum light intensity of said predetermined segments.

9. Apparatus as claimed in claim 6 wherein said document consists of a dark background document and the information contained thereon appears as light marks to said means for scanning, said scan line output signal being a measurement of the dark-to-light response of said means for scanning, said stored peak signal levels corresponding to the minimum light intensity of said predetermined segments.

10. In an apparatus for extracting information from a document having a light background wherein the information appears as dark marks or characters on the document wherein a scanning device generates a scan line output signal on a line-by-line basis indicative of the light-to-dark response of the scanning device to the information on each scan line of the document, the improvement for compensating the scan line output signals for variations in ambient or background light intensity or aberrations produced by optics associated with the scanning device, said improvement comprising, means for storing peak signal levels of each of a predetermined number of segments of a scan line representing the maximum light intensity of the corresponding segments of one or more scan line output signals, and means for comparing the scan line output signals to the corresponding stored peak signal levels to compensate said scan line output signals on a segment-by-segment basis for variations in ambient or background light intensity or aberrations produced by optics associated with the scanning device.

11. In an apparatus for extracting information from a document via a line-by-line scanning device, said document having a light background and preprinted locations for entering information as a dark mark or character, said locations including a length dimension extending perpendicular to the line scanning operation of the scanning device, said scanning device generating a scan line output signal indicative of the light-to-dark response of the scanning device to information on each scan line of the document, the improvement for compensating the scan line output signals for variations in ambient or background light intensity or aberrations produced by optics associated with the scanning device, said improvement comprising, means for storing peak signal levels of each of a predetermined number of segments of a scan line representing the maximum light intensity of the corresponding segments of a predetermined number of scan line output signals, the minimum number of said predetermined number of scan lines being the number of scan lines required to scan the length dimension of said preprinted locations of said document, and means for comparing the scan line output signals to the corresponding stored peak signal levels to compensate said scan line output signals on a segment-by-segment basis for variations in ambient or background light intensity or aberrations produced by optics associated with said scanning device.

12. In apparatus as claimed in claim 11 further including, means for discarding said stored peak signal levels and refreshing the stored peak signal levels after a predetermined number of scan lines of said document.

* * * * *